June 12, 1956 E. F. HISCOCK 2,749,835
COFFEE MAKER AND COFFEE PACKET HOLDING ACCESSORY THEREFOR
Filed March 31, 1952 2 Sheets-Sheet 1
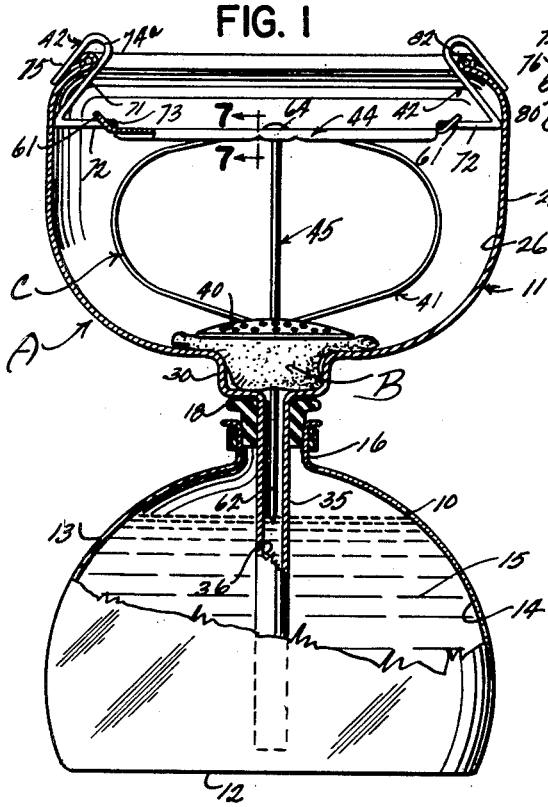
Inventor
Earle F. Hiscock June 12, 1956 — E. F. HISCOCK — 2,749,835
COFFEE MAKER AND COFFEE PACKET HOLDING ACCESSORY THEREFOR
Filed March 31, 1952 — 2 Sheets-Sheet 2

Inventor
Earle F. Hiscock

By Lancaster, Allwine & Rommel
Attorneys

United States Patent Office 2,749,835
Patented June 12, 1956

2,749,835

COFFEE MAKER AND COFFEE PACKET HOLDING ACCESSORY THEREFOR

Earle F. Hiscock, Washington, D. C., assignor to Kip, Inc., Washington, D. C., a corporation of Delaware Application March 31, 1952, Serial No. 279,521

4 Claims. (Cl. 99—295)

This invention relates to improvements in coffee makers and accessories therefor.

The primary object of this invention is the provision of an improved vacuum type coffee maker having an improved means for yieldably holding a packet or coffee containing unit in such manner as to most efficiently control the brewing action.

A further object of this invention is the provision of an improved accessory adapted for use in connection with conventional vacuum type coffee makers for holding and maintaining a coffee containing packet or unit within the maker, during the brewing action.

A further object of this invention is the provision of a relatively inexpensive attachment adapted for vacuum type coffee makers, by means of which the maker is rendered adaptable for the use of packets or units containing comminuted coffee.

A further object of this invention is the provision of an accessory for use in connection with conventional type coffee makers which will render the latter adaptable for receiving comminuted coffee encased packets or units for the efficient brewing of coffee therein; the improved accessory being such that the parts thereof when disassembled can be compactly packaged for merchandising purposes.

Other objects and advantages of the invention will be apparent during the course of the following detailed description.

In the accompanying drawing, forming a part of this specification, and wherein similar reference characters designate corresponding parts throughout the several views:

Figure 1 is a vertical cross sectional view taken thru the improved vacuum type coffee maker, showing the improved means associated therewith for maintaining a coffee containing packet or unit in proper brewing position within the maker.

Figure 2 is a side elevation of the improved attachment or accessory for use in conventional type coffee makers, and by means of which the maker is rendered adaptable for receiving self contained coffee units wherein comminuted coffee is encased.

Figure 3 is a perspective view of an improved type clip or holder adapted for connection with conventional type coffee makers, to render the maker adaptable for receiving an attachment by which coffee packets may be used with coffee makers.

Figure 9 is a fragmentary cross sectional view taken transversely thru a packet impaling pin at the head end thereof and a cross member, showing the means of connecting the ends of a spring to the cross member and pin top.

Figure 4:
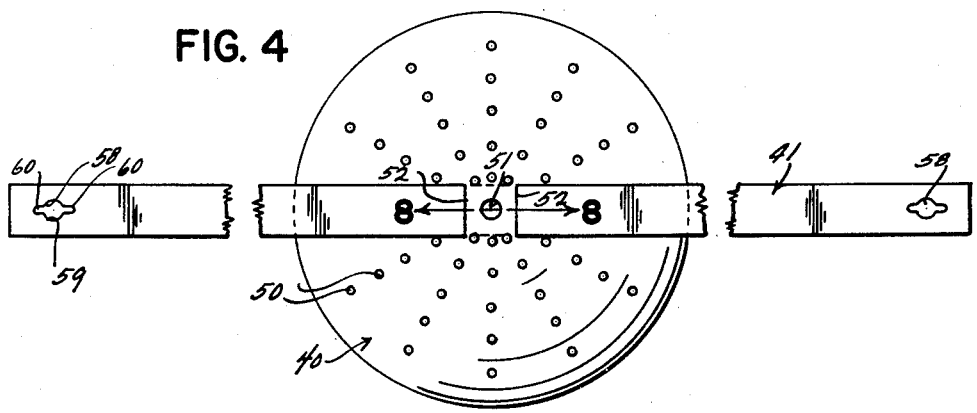
Figure 4 is a fragmentary plan view showing the developed positions of a spring and packet holder used as a part of the attachment.

In the drawings, wherein for the purpose of illustration is shown a preferred embodiment of the invention, the letter A may generally designate a vacuum type coffee maker wherein it is adapted to use a comminuted coffee encasing unit or packet B, held down by the improved attachment or accessory C for the maintenance of the packet in proper position and condition within the coffee maker, for the most efficient brewing of coffee.

I have shown in my copending application Serial No. 174,476, filed June 18, 1950, how it is possible to effectively use spring action for maintaining the coffee packet in proper position during the brewing action in a coffee maker; the last mentioned application showing a variety of attachments for use in coffee makers to provide for the proper brewing action and positioning of the packet in the maker. In the present invention, I have provided an improved accessory or attachment which will properly maintain the packet within the coffee maker under such circumstances that not only will the packet be properly manipulated during the surging of the coffee liquor within the vacuum type coffee maker, but the details of the accessory used to hold and regulate the packet is such that it lends itself for adaptation to conventional types of coffee makers.

Referring to the coffee maker A, the same comprises a lower receptacle portion 10 and an upper receptacle portion 11. They may be fabricated of steel, aluminum, heat resistant plastic, glass, or other material. The lower receptacle portion 10 includes a flat bottom wall 12 having an upwardly convergent dome-shaped side wall construction 13 defining a compartment 14 adapted to receive boiling water or coffee liquor, designated at 15 in the drawings. The neck portion 16 of the receptacle 10 is reduced and receives a heat resistant and insulated plastic or synthetic rubber nipple or seat 18 having a passageway therethru.

The upper receptacle portion 11 includes a main bowl 25 of any approved shape, defining a compartment 26 opening at the top of the receptacle for receiving the coffee packet B and the accessory C therein. A cover may be provided if desired, but this is ordinarily not necessary in connection with present day vacuum type coffee makers. At its lower end the bowl 25 may have integrally formed therewith a well 30. The well 30 has a bottom wall 32 with a preferably integrally connected depending tube 35 provided with a passageway 36 therethru. The tube 35 is adapted to fit snugly but detachably in the passageway of the insulation collar or nipple 18, and it extends into the compartment 14 of the lower receptacle 10 in manner conventional with vacuum type coffee makers.

The coffee packets B are of the type described in my co-pending application Serial 174,476, filed July 18, 1950. They may consist of an outer covering of uniformly woven synthetic yarn filled with comminuted coffee after the manner described in my co-pending application Serial 281,354, filed April 9, 1952.

Referring to the attachment or accessory C, the same is provided for the purpose of holding and maintaining the packet B in proper position within the coffee maker A, so that the packet can be manipulated as a result of the surging of the liquor, as an incident of coffee brewing, in order that the packet will be given a squeezing action and for the maximum extraction of flavorable materials from the coffee, for the production of a delicious brew.

This accessory or attachment C preferably comprises a perforated hold-down cap 40 having a spring 41 connected therewith. Clips 42 are provided for connection to the conventional coffee maker A by means of which the other details of the attachment may be secured properly in place to hold the coffee packet B in position. A cross or top member 44 is provided for detachable connection or socketing upon the clips 42 in order to maintain the spring and cap details 40 and 41 in proper position for hold-down of the packet B. A spear or packet impaling pin or member 45 is provided, having connection with the cross member 44, which also serves the purpose of holding the ends of the leaf type spring 41 in position upon the cross member 44.

The cap 40 is preferably concavo-convex in cross section, and in fact it comprises the small segment of a sphere. It may be constructed of plastic, aluminum or any other suitable material, and is preferably rigid. It has perforations 50 therein, in any desired number, for the purpose of permitting passage of the coffee liquor therethru. It is provided with a central passageway or opening 51 to receive the packet impaling pin 45.

Figure 8:
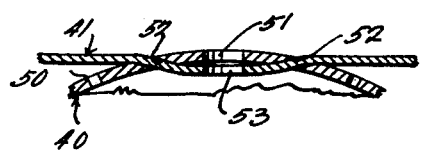
Figure 8 is a transverse cross sectional view taken substantially on the line 8—8 of Figure 4 and showing how the spring is connected to the perforated holding cap.

The spring 41 may assume different shapes. Preferably, it is a leaf type spring, of uniform width from end to end. In its sprung position it lies perfectly flat, as is fragmentarily shown in Figure 4. This for the reason that the device C is intended, in one instance, to be sold as accessory for use in connection with conventional coffee makers, and for merchandising purposes it is important that the details of the device be capable of compact assemblage and packaging. As a matter of fact, the spring 41 is threaded thru slots 52 provided transversely thru the dome of the cap 40 at opposite sides of the central passageway 51. These slots 52 may be so fashioned that they will hold the central part of the spring 41 slightly crimped, as shown in Figure 8, but the spring will otherwise lie in flattened condition as shown in Figure 4, for the purposes above described. It should be understood that the leaf type spring 41 and the cap 40 are fabricated of quite thin gauged metal or other material, and that is also true of the top or cross piece 44. The spring 41 intermediate its ends is also provided with an opening 53 which aligns with the opening 51 as shown in Figure 8 to receive the packet impaling pin 45.

The leaf spring 41 at its ends is provided with key slot type openings 58, each of which includes a central opening 59 and reduced oppositely disposed end slots or openings 60. These key hole slot type openings are intended to also receive the impaling pin 40 in a manner to be subsequently described.

The cross piece 44 is preferably fabricated of sheet metal, plastic or other suitable material. In the main it comprises an elongated channel shaped body having a top wall portion 55 and depending side flanges 56 and 57. The latter are quite short and are mainly provided for the purpose of strengthening the thin gauged holding member 44, and to provide socketing means for receiving the ends of the spring 41.

At its ends the cross piece 44 has clip attaching ear or lugs 61 contiguous with the body portion 55 and which are upturned and adapted for socketing within the clips 42 in the manner shown in Figures 1 and 2, as will be subsequently described. The body portion 55 of the hold-down cross piece 44 is centrally provided with a keyhole type opening 58a, of the same construction as the openings 58 above described.

The pin 45 includes an elongated shank or body portion 62, the free end of which may be pointed at 63 and the top of which has head 64. Spaced from the head and integral therewith at diametrically opposite sides the shank 62 may be provided with bosses or lugs 65.

Referring to assemblage of the pin 45, cross piece 44, spring 41 and cap 40 above described, the free ends of the spring 41 are brought into overlapping position and slid thru the way of the channel passageway of the cross piece 44, until the end apertures 58 are aligned with the apertures 58a of the cross piece 44. In this connection it should be noted that the flanges 56 and 57 are crimped at 68, two of such crimps being provided in each flange, one at each side of the openings 58a; the crimps being inwardly and providing means to retain the ends of the spring 41 in position when the apertures 58 and 58a are aligned. As is shown in Figure 9, this holds the spring ends in flattened position within the way of the channel, and the impaling pin 45 is then slipped thru the openings 58 and 58a, as shown in Figure 9. The lugs 65 are aligned so that they will slip thru the extension 60 of the keyhole openings, and when the impaling pin head 64 engages the top surface of the cross piece 44, the pin may be given a slight turn and the lugs 65 will be in position to hold the pin against longitudinal movement with respect to the cross piece 44, as is quite obvious. The shank 62 of the pin 45 during this assemblage action is slipped thru the aligning openings 51 and 53 of the cap and spring. It is of a length so that the pointed end thereof depends sufficiently for not only impaling the packet B, but also it enters the passageway 36 of the coffee maker tube 35 when the accessory is in position to hold the packet B against lateral displacement.

It should be noted that the spring 40 when secured in the manner above described assumes a substantially circular shape, as shown in Figure 2. In that view the dot and dash lines indicate the compressed position of the spring so that it may exert a yielding force upon the packet when in the coffee maker.

Referring to the clips 42, the same are of identical construction, and they may assume a variety of forms. Their object is solely to act as a means for anchoring the cross member 44 within convention of the coffee maker, and to that end they preferably are provided with a socket or opening to receive the ears or lugs 61 of the cross member 44.

In the specific clip 42 shown in the drawings, the same may be constructed of non-corrosive spring wire of any desired material, and preferably it includes a pair of arm portions 70 and 71 in parallel relation, which at their lower ends have the acute angled parallel arms 72 connected therewith; the ends of the extensions 72 being connected by a cross bar 73 and thus providing a socket opening 74 to receive the ear or lug portion 61 above described. At their outer or upper ends the arms 70 and 71 are preferably convexly curved at 74a and then downturned and outturned at 75 and then upturned and outturned at 76; the bight or connection portion 74a providing the necessary spring action between the portions 75—76 and the portions 70 and 71 for clamping at opposite sides of the wall of the receptacle portion 11 of the coffee maker A. The portions 72—73 when the clip is attached to the maker will ordinarily lie substantially horizontal and place the openings 74 in position for receiving the lugs or ears 61 of the cross member 44. The wire of which the clip is formed is strongly resilient and the clips may thus be securely attached upon the top margin of the receptacle 11, as shown in Figure 1. Since the top wall portion of the receptacle 11 of coffee makers differ widely in construction, the clip at its clamping end has been made sufficiently adaptable for use with a variety of coffee makers, so that it will engage beaded top walls, inturned walls and vertical walls of coffee makers, according to the characteristics of the maker itself. It is not necessary that the portions 72—73 lie horizontal, since the opening 74 will still function to properly receive the ears of the cross bar 44, as it is quite obvious. Suffice to say that the spring clamping action of the portions 71, 74a, 75 and 76 clamp upon the receptacle top margin with a very firm capable grip, so that the clips will not become easily loosened as the result of flexing of the spring 41 during coffee brewing action.

The clips 42 are detachably connected to the coffee maker receptacle 11 in the manner shown by Figure 1.

It is to be noted that the slope of the arm portions 76 with respect to the arm portions 70 is such as to provide an upwardly convergent way or passage entrance 80, shown in Figure 2 of the drawings, which readily enables the clip to be cammed over the top margin of the maker 11. In event a bead, such as shown at 82, is provided upon the top of the receptacle 11, the ends of the arms 76 provide an additional anchoring means for the clips.

With the clips 52 diametrically opposed upon the coffee maker receptacle 11, and the packet B in the position over the well of the receptacle 11, it is merely necessary to lower the rest of the assemblage into the coffee maker receptacle 11, impaling the packet B with the pointed end of the pin 45. The concavity of the cap 40 will fit over the top of the packet, and since the marginal portions of the cap 40 are extended beyond the well 30, the margins of the packet will be clamped as shown in Figure 1 upon the bottom of the receptacle wall 25 without a too forced clamping of the body of the packet within the well, such as might prevent proper surging of the liquor and proper brewing action. With the details in this position the cross bar 44 may be slightly turned so that the ears 61 socket in the opening 74 of the clips 42 and this will flex the spring 41 to the position shown in Figure 1, and in dot and dash line position also shown in Figure 2 for yieldably and resiliently forcing the cap 40 downwardly upon the packet B. The spring 41 has just the proper yielding action so that the packet B may slightly rise and further flex the spring during the surging action of the liquor under brewing action within the coffee maker.

As an incident of brewing action the vapor and liquor have free access thru the permeable beverage containing bag or sack B, and as a consequence of the pressure and releasing of pressure against the sack B, by the venting action of the liquor and vapor, an intermittent squeezing action is provided upon the swollen coffee mass in the packet B. The intensity of the action varies with the amount of heat applied to the coffee maker.

Figure 5:
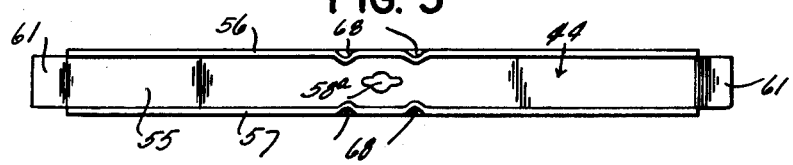
Figure 5 is a bottom plan view of a cross member or device which is adapted to be held by the clips of Figure 3 in position within the coffee maker.
Figure 6:
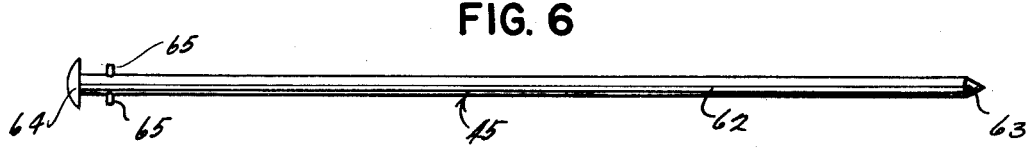
Figure 6 is a side elevation of a pin or spear used as a part of the attachment of Figure 2.
Figure 7:
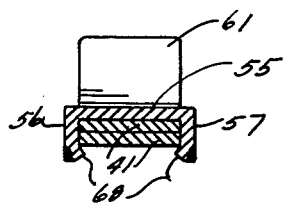
Figure 7 is a transverse cross sectional view taken thru the attachment substantially on the line 7—7 of Figure 1.

It will be noted that the major details of the accessory as shown in Figures 4, 5 and 6 all lend themselves to ready packaging in an elongated flattened condition, and the clips 42 are not bulky, so that the entire accessory may be very compactly packaged for merchandising purposes.

Various changes in the shape, size and arrangement of parts may be made to the form of invention herein shown and described without departing from the spirit of the invention or scope of the claims.

I claim:

1. In an attachment for coffee makers for the purpose of holding coffee packets in brewing position within vacuum type coffee makers the combination of a cross bar, coffee maker attaching clips detachably connected to the ends of said cross bar, a multi-perforated coffee packet hold-down member, a pin connected with the intermediate portion of the cross member and depending therefrom and having said hold-down member slidable thereupon, and spring means connected between said cross member and hold-down member and urging the latter downwardly upon said pin towards the lower end thereof.

2. In an accessory for use in connection with the holding down of coffee packets within vacuum type coffee makers the combination of a perforated packet hold-down disc, a leaf type spring connected intermediate its ends with the central portion of said disc and extending in diametrically opposed relation from opposite sides thereof, a top cross member having means centrally thereof to connect the ends of said spring so that the spring will be bowed resiliently to hold the hold-down disc spaced from said cross member, a coffee packet impaling pin connected centrally with the cross member and securing the ends of the bowed spring in position upon said cross member, said pin at its lower portion slidably extending thru said disc and spring and depending therefrom for packet impaling purposes.

3. An accessory for use within vacuum type coffee makers for holding down a permeable flexible packet of comminuted coffee over the passageway in the upper chamber of a conventional coffee maker, a disc adapted to rest over the top of such a packet said disc having a large number of perforations in it to permit passage of liquid therethrough, an elongated leaf type spring naturally assuming a rectilinear position removably connected midway between its ends to the center of the disc like member, a cross bar having means thereon for releasable connection to the upper receptacle of a coffee maker, means upon said cross bar to releasably connect the outer ends of the spring substantially midway between the ends of the cross bar for flexing and holding said spring bowed so that normally it urges the disc away from the cross bar, and a packet impaling pin releasably connected centrally to the cross bar and extending releasably through the ends of said spring connected upon the cross bar, said pin being extended substantially at right angles to the cross bar and slidably extending through the packet hold down disc and having a lower end extending substantially below said disc for packet impaling purposes.

4. In combination with a vacuum type coffee maker including an upper receptacle portion, a lower receptacle portion, a tube having a passageway opening into the upper receptacle portion and extending downwardly into the lower receptacle portion, a flexible porous beverage material enclosing casing mounted in the upper receptacle portion above and covering the tube passageway, a perforated hold-down cap disposed in the upper receptacle portion and engaging said coffee packet over the major top area thereof at a location aligned with and above said tube passageway, means for detachable connection with the upper receptacle portion above said perforated cap comprising a supporting structure, a packet impaling pin connected to said supporting structure and depending therefrom and slidably extended through the perforated hold-down cap and impaling said beverage packet and extending at its lower end into the upper portion of the passageway of said tube for the purpose of holding the position of the packet against lateral displacement from above the tube passageway, and a spring connected to said supporting construction and engaging said cap and being normally under compression for resiliently urging the perforated cap against said packet when in the relation described in said maker, the compressive force of said spring being such that under liquor surge of brewing action the spring will be flexed for intermittently squeezing the packet between its resting location in the upper receptacle and said perforated hold-down cap.

References Cited in the file of this patent

UNITED STATES PATENTS

| | | |
|---|---|---|
| 177,173 | Theobald | May 9, 1876 |
| 211,236 | Hartman | Jan. 7, 1879 |
| 785,693 | Brown | Mar. 21, 1905 |
| 871,492 | Dunlop | Nov. 19, 1907 |
| 1,335,048 | Diefendorf | Mar. 30, 1920 |
| 1,377,316 | Clermont | May 10, 1921 |
| 1,876,474 | Starkey | Sept. 6, 1932 |
| 1,916,221 | Janssen | July 4, 1933 |
| 1,947,523 | Hirschhorn | Feb. 20, 1934 |
| 2,129,587 | Nevius | Sept. 6, 1938 |
| 2,192,225 | Gleason | Mar. 5, 1940 |
| 2,258,589 | Lehmann | Oct. 14, 1941 |
| 2,286,990 | Lehmann | June 16, 1942 |
| 2,301,917 | Johnson | Nov. 17, 1942 |
| 2,345,146 | Perlusz et al. | Mar. 28, 1944 |
| 2,370,096 | Walder et al. | Feb. 20, 1945 |

(Other references on following page)

UNITED STATES PATENTS

| | | |
|---|---|---|
| 2,388,335 | McCullough | Nov. 6, 1945 |
| 2,451,195 | Brown | Oct. 12, 1948 |
| 2,460,735 | Carroll | Feb. 1, 1949 |
| 2,464,722 | Sacker | Mar. 15, 1949 |
| 2,506,013 | Columbus | May 2, 1950 |
| 2,620,088 | Tellander | Dec. 2, 1952 |

FOREIGN PATENTS

| | | |
|---|---|---|
| 417,281 | Germany | Aug. 11, 1925 |
| 638,789 | Great Britain | June 14, 1950 |
| 867,105 | France | June 30, 1941 |